US011400668B2

(12) United States Patent
von Blanckenhagen et al.

(10) Patent No.: US 11,400,668 B2
(45) Date of Patent: Aug. 2, 2022

(54) 3D PRINTING PROCESS FOR PRODUCING A SPECTACLE LENS

(71) Applicant: Carl Zeiss Vision International GmbH, Aalen (DE)

(72) Inventors: Bernhard von Blanckenhagen, Aalen (DE); Michael Totzeck, Schwäbisch Gmünd (DE); Thomas Glöge, Schorndorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 252 days.

(21) Appl. No.: 16/384,185

(22) Filed: Apr. 15, 2019

(65) Prior Publication Data

US 2019/0240938 A1    Aug. 8, 2019

Related U.S. Application Data

(63) Continuation of application No. PCT/EP2017/076808, filed on Oct. 20, 2017.

(30) Foreign Application Priority Data

Oct. 21, 2016  (EP) .................................... 16195137

(51) Int. Cl.
*B29D 11/00*         (2006.01)
*B29C 64/106*        (2017.01)
*B33Y 80/00*         (2015.01)
*B29L 11/00*         (2006.01)

(52) U.S. Cl.
CPC ...... *B29D 11/00009* (2013.01); *B29C 64/106* (2017.08); *B29D 11/00865* (2013.01); *B33Y 80/00* (2014.12); *B29L 2011/0016* (2013.01)

(58) Field of Classification Search
CPC ........ B29D 11/00009; B29D 11/00865; B33Y 80/00; B29C 64/106; B29L 2011/0016
See application file for complete search history.

(56) References Cited

U.S. PATENT DOCUMENTS

| | | | |
|---|---|---|---|
| 5,959,761 A | 9/1999 | Perrott et al. | |
| 6,632,535 B1 | 10/2003 | Buazza et al. | |
| 9,278,885 B2 | 3/2016 | Lacan et al. | |
| 9,500,860 B2 | 11/2016 | Gloege et al. | |
| 9,957,398 B2 | 5/2018 | Hugenberg et al. | |
| 2003/0116872 A1* | 6/2003 | Klemm | G02B 1/105 264/1.31 |
| 2004/0074261 A1 | 4/2004 | Caron et al. | |
| 2006/0065989 A1 | 3/2006 | Druffel et al. | |
| 2011/0228214 A1 | 9/2011 | von Blanckenhagen | |
| 2014/0327006 A1* | 11/2014 | Ke | H01L 27/1266 257/49 |
| 2015/0241714 A1 | 8/2015 | Allione et al. | |
| 2016/0114542 A1 | 4/2016 | Quere et al. | |
| 2016/0167299 A1 | 6/2016 | Jallouli et al. | |
| 2016/0167323 A1 | 6/2016 | Valeri et al. | |
| 2016/0311184 A1 | 10/2016 | Gourraud | |
| 2017/0297955 A1 | 10/2017 | Gloege | |
| 2019/0366622 A1* | 12/2019 | Blomaard | B29D 11/00442 |

FOREIGN PATENT DOCUMENTS

| | | |
|---|---|---|
| DE | 19848591 A1 | 10/1999 |
| DE | 69534779 T2 | 7/2006 |
| DE | 102015209794 A1 | 12/2016 |
| EP | 1392613 A1 | 3/2004 |
| EP | 1395417 B1 | 8/2006 |
| EP | 2578649 A1 | 4/2013 |
| EP | 2664659 A1 | 11/2013 |
| EP | 2203300 B1 | 8/2015 |
| JP | 2008191186 A | 8/2008 |
| WO | 2009041707 A2 | 4/2009 |
| WO | 2014049273 A1 | 4/2014 |
| WO | 2015086981 A1 | 6/2015 |
| WO | 2016003275 A1 | 1/2016 |
| WO | 2016094706 A1 | 6/2016 |

OTHER PUBLICATIONS

English-language translation of the Extended European Search Report of the European Patent Office for European application EP 16195137.1, to which this application claims priority, dated Feb. 27, 2017.
English-language translation of an Office Action by the European Patent Office for European application EP 16195137.1, to which this application claims priority, dated Jan. 2, 2019.
Office Action of the Chinese Patent Office for Chinese application CN 201780064414.2, which is a counterpart hereof, dated Oct. 21, 2019, and English-language translation thereof.
Office Action of the Chinese Patent Office for Chinese application CN 201780064414.2, which is a counterpart hereof, dated Apr. 15, 2020, and English-language translation thereof.
"Ophthalmic optics—Spectacle lenses—Vocabulary (ISO 13666:2012)," German and English version EN ISO 13666:2012, Oct. 2013.
Extended European Search Report of the European Patent Office for European application EP 16195137.1, to which this application claims priority, dated Feb. 27, 2017.
Office Action of the European Patent Office for European application EP 16195137.1, to which this application claims priority, dated Jan. 2, 2019.
Opposition filed in the EPO against EP 3311994 B1, which is a counterpart hereof, dated Oct. 8, 2020, and English-language machine translation thereof.

* cited by examiner

*Primary Examiner* — Mathieu D Vargot
(74) *Attorney, Agent, or Firm* — Tautz & Schuhmacher LLC; Georg Hasselmann

(57) ABSTRACT

A process, in particular a 3D printing process, for producing a spectacle lens is disclosed. The process includes providing a coated substrate, providing a three-dimensional model of the spectacle lens, digitally cutting the three-dimensional model into individual two-dimensional layers, providing at least one printing ink, typically a 3D printing ink, building up the spectacle lens from the sum of the individual two-dimensional layers with a printing operation on the substrate, and hardening of the spectacle lens. The hardening can take place completely or partially after application of individual volume elements or after application of a layer, and the partial hardening can be completed after conclusion of the printing process.

14 Claims, No Drawings

3D PRINTING PROCESS FOR PRODUCING A SPECTACLE LENS

CROSS REFERENCE TO RELATED APPLICATIONS

This application is a continuation application of international application PCT/EP2017/076808, filed Oct. 20, 2017, which claims priority to European patent application EP 16195137.1, filed on Oct. 21, 2016, both of which are hereby incorporated by reference in their entireties.

TECHNICAL FIELD

The present disclosure relates to a process, especially 3D printing process, for producing a spectacle lens.

BACKGROUND

Spectacle lenses are distinguished between spectacle lenses having no nominal dioptric power and corrective spectacle lenses, i.e., spectacle lenses having dioptric power. According to DIN EN ISO 13666, dioptric power is the collective term for the focusing and the prismatic power of a spectacle lens.

In the case of corrective spectacle lenses, a distinction is also drawn between monofocal spectacle lenses and multifocal spectacle lenses. A monofocal spectacle lens is a spectacle lens in which there is only one dioptric power. A multifocal spectacle lens is a spectacle lens in which there are two or more different regions having different dioptric powers in the spectacle lens.

The shape that the spectacle lens has to adopt on its front face and/or reverse face in order to obtain the desired optical correction is determined to a crucial degree by the material from which the spectacle lens is manufactured. The most important parameter here is the refractive index of the material used. While spectacle lenses used to be produced predominantly from mineral glasses, especially crown glasses (Abbe number >55) and flint glasses (Abbe number <50), spectacle lenses made from a multitude of organic materials have now become available. The refractive index of the mineral glasses suitable for spectacle lenses may be higher than the refractive index of the organic materials usable for spectacle lenses. Particular features of spectacle lenses based on mineral glasses are their high scratch resistance and good chemical stability. By comparison, spectacle lenses based on organic materials have the particular features of lower specific weight and high fracture resistance.

Spectacle lenses based on mineral glasses are regularly produced by mechanically abrasive machining of a spectacle lens blank. In a spectacle lens blank, neither the front face nor the reverse face already corresponds to the ultimate, optically effective target faces. The optical face of a spectacle lens destined for arrangement on the object side is referred to as the front face; the optical face of a spectacle lens destined for arrangement on the eye side is referred to as the reverse face. The face between them, which either directly forms an edge or indirectly adjoins the front face at one end and the reverse face at the other end via an edge face, is referred to as cylinder edge face. The above-defined terms "front face", "reverse face" and "cylinder edge face" are used analogously hereinafter for semifinished spectacle lenses and finished spectacle lenses.

Spectacle lenses based on organic materials are cast, for example, as semifinished spectacle lenses with spherical, rotationally symmetric aspherical or progressive front faces in mass production in prototypes with front face and reverse face mold shells that are spaced apart from one another with a sealing ring, forming a cavity, as described, for example, in JP 2008191186 A. The reverse face of a semifinished spectacle lens thus produced can, for example, be machined in a mechanically abrasive manner to obtain a finished spectacle lens.

Semifinished spectacle lenses, also referred to as finished or semifinished products, are spectacle lens blanks having a front face or reverse face that already corresponds to the ultimate, optically effective target face. Finished spectacle lenses, also referred to as ready-made or finished products or ready-made spectacle lenses, are spectacle lenses having a front face and reverse face that is already the ultimate, optically effective target face. Finished spectacle lenses may, for example, either be cast as finished spectacle lenses, for example in prototypes with front and reverse face mold shells spaced apart from one another with a sealing ring, forming a cavity, or be manufactured with an Rx process. Finished spectacle lenses are generally also edged, i.e., converted to the ultimate shape and size matched to the spectacle frame by edge processing.

WO 2016/003275 A1 discloses a process for printing a three-dimensional lens structure with the aid of a substrate, wherein the substrate has a defined surface. The surface of the substrate may have been covered with an interlayer of a liquid UV-curable or heat-curable polymer which enables perfect fitting of the fragments applied from the printing process. Two of the lens elements may be joined via their planar surface opposite the substrate. At least one functional layer, for example a filter or an electrically conductive polymer, may then be arranged between the two lens elements. WO 2016/003275 A1 does not refer to spectacle lenses.

US 2006/0065989 A1 discloses a process for producing a lens, in which a hard lacquer layer, an antireflection layer or an antireflection layer and a hard lacquer layer is first applied to a surface of the casting mold, before it is filled with a liquid monomer mixture. After the monomer mixture has cured, the single-sidedly coated lens is removed from the casting mold.

US 2011/0228214 A1 discloses a spectacle lens having an antireflection layer which produces a residual reflection with a color-neutral appearance both under illumination with a natural daylight spectrum and under illumination with a daylight spectrum other than the natural daylight spectrum.

WO 2016/094706 A1 discloses a curable liquid nanocomposite for the additive manufacturing of lenses, wherein the nanocomposite comprises one or more crosslinkable monomers or oligomers, a photoinitiator and nanoparticles. The nanocomposite comprises about 70% to 98% by weight, 75% to 95% by weight, 80% to 95% by weight, 80% to 90% by weight or 82% to 97% by weight, based on the total weight of the curable nanocomposite, of crosslinkable monomers. The nanocomposite contains about 70% to 98% by weight, 75% to 95% by weight, 80% to 95% by weight, 80% to 90% by weight or 82% to 97% by weight, based on the total weight of the curable nanocomposite, of monoacrylates. The nanocomposite contains about 30% to 60% by weight, about 35% to 50% by weight or about 35% to 45% by weight of monoacrylates. The nanocomposite contains diacrylates and triacrylates in a total amount of about 10% to 50% by weight, about 15% to 45% by weight or about 20% to 40% by weight. The nanocomposite contains both crosslinkable monomers and oligomers in a proportion of more than about 70% by weight, typically more than about 75% by weight, for example about 75% to 99% by weight, about 75% to 95% by weight or about 80% to 90% by weight.

SUMMARY

It is an object of the present disclosure to provide a process which enables in situ manufacture of a spectacle lens, for example directly at an optician's premises and not centrally at a spectacle lens production site.

This object is achieved by providing a process comprising the following steps:
i. providing a coated substrate, where the substrate has optionally been covered with a detachable bonding layer and the coating of the substrate is selected from the group consisting of at least one hard lacquer layer, at least one antireflection layer, at least one electrically conductive or semiconductive layer, at least one antifog coating and/or at least one clean-coat layer,
ii. providing a three-dimensional model of the spectacle lens,
iii. digitally cutting the three-dimensional model from step ii. into individual two-dimensional slices,
iv. providing at least one printing ink, typically 3D printing ink,
v. constructing the spectacle lens from the sum total of the individual two-dimensional slices from step iii. by means of a printing operation on the substrate,
vi. curing the spectacle lens, wherein the curing can be effected fully or partially after each application of individual volume elements or after application of a slice of volume elements, and the partial curing can be completed on completion of the printing process,
vii. optionally machining and/or grinding and/or turning and/or polishing the surface of the spectacle lens obtained in step vi. that does not adjoin the substrate,
viii. detaching the spectacle lens obtained in step vii. together with the coating from the substrate,
ix. optionally coating the surface of the spectacle lens remote from the substrate, and
x. optionally, edging the spectacle lens obtained in step ix.

DESCRIPTION OF EXEMPLARY EMBODIMENTS

Exemplary embodiments of a process enabling in situ manufacture of a spectacle lens are disclosed below.

The present disclosure relates exclusively to spectacle lenses, not to contact lenses.

A spectacle lens of the disclosure is constructed with a printing method, especially 3D printing method, by printing on a precoated substrate. The precoated substrate here defines the surface topography of that surface of the spectacle lens that adjoins the precoated substrate. The face of the spectacle lens opposite the surface can be constructed in a controlled manner with a printing method, especially a 3D printing method. The surface to be constructed here may have a spherical, aspherical, toric, atoric, progressive, or planar surface topography. Alternatively, the surface to be constructed may be produced as a symmetrical free-form face or as an unsymmetrical free-form face. The 3D printing method is an additive manufacturing method in which the desired surface topography of one of the surfaces of the spectacle lens is produced exclusively by material application. The three-dimensional shape of the spectacle lens to be printed, which can also take account of individualized aspects, for example the diameter, the radius of curvature, or individual prescription values, for example a progression face with defined progression value and course of the progression channel, is first cut digitally into two-dimensional horizontal slices. The information relating to the individual two-dimensional slices to be printed one on top of another is provided to the printer, especially 3D printer, and the spectacle lens is thus constructed from the sum total of the individual two-dimensional slices. A slice to be printed comprises the adjacent arrangement of volume elements—i.e., the adjacent arrangement of printing ink, typically 3D printing ink, after release from a printhead, typically from a printhead suitable for 3D printing—in an area, where the dimensions of the volume elements depend on factors including the diameter of the printhead nozzles. The smallest possible volume element corresponds to the volume of a drop of printing ink, typically 3D printing ink. It is possible to arrange multiple slices of adjacently arranged volume elements one on top of another, i.e., print them one on top of another. The two-dimensional extent and the number of slices to be printed one on top of another depends on the desired dimensions of the spectacle lens to be printed. The individual slices can be cured in slices, typically with UV light, until reaction of the radiation-curable component is complete. Alternatively, the printing of each slice may be followed by incomplete curing, and the printing of all slices may be followed by final curing, typically with UV light in each case.

The printer, especially 3D printer, comprises at least one printhead which, by the drop-on-demand method known from inkjet printing, produces volume elements with a piezoelectric element and only ever positions a volume element exactly at the position where it is required. The at least one printhead may move under the precoated substrate and/or precoated substrate may move under the at least one printhead. Typically, the 3D printing method used is multijet modeling or the polyjet method. The printhead used may, for example, be the Xaar 1001 printhead (from Xaar), one of the Spectra S-Class, Spectra SE3, Spectra SX3, Spectra Q-class printheads (from Spectra), the KM512 printhead (from Konica Minolta) and/or the 256Jet S4 printhead (from Trident). The resolution of the printhead is typically at least 300×300 dpi, further typically at least 600×600 dpi and more typically at least 1200×1200 dpi. Typically, at least one UV light source is mounted on at least one side of the printhead used; more typically, at least one UV light source is mounted on at least two sides of the printhead used. Alternatively, multiple printheads in parallel can be installed in a 3D printer and selectively actuated. The UV light source may then consist of multiple UV light sources likewise connected in parallel, or of few large UV light sources.

The spectacle lens produced with a printing method, especially 3D printing method, may require at least one further mechanical processing step, for example polishing. However, the spectacle lens produced with a printing method, especially 3D printing method, typically does not require any further mechanical processing step, for example machining and/or grinding and/or turning and/or polishing.

For the slice-by-slice construction of the spectacle lens, a printing ink usable in a 3D printing method is typically used. "Slice-by-slice construction" comprises successive deposition of the printing ink, typically 3D printing ink. The successive deposition can be effected here either adjacently in an area or in a vertically superposed manner. If, for example, a first deposition of the printing ink, typically 3D printing ink, is effected in an area on the precoated substrate, a further slice can be printed over the complete area of the first deposition or part of the area of the first deposition.

Typically, the successive deposition of the printing ink, typically 3D printing ink, is first effected adjacently in an area before further successive deposition of the printing ink, typically 3D printing ink, is then effected in the slice above.

The precoated substrate to be printed is a substrate which, proceeding from substrate a), has optionally been covered with a detachable bonding layer and b) with the coating desired on the spectacle lens. The bonding layer optionally present is a layer applied directly to the substrate, the bonding of which can be altered by external influences, for example a change in temperature or by irradiation, and hence the spectacle lens produced with a printing method, typically 3D printing method, can be detached therefrom together with the coating present on the detachable bonding layer optionally present. Alternatively, the layer directly adjoining the substrate may be a layer easily separable from the substrate. The latter is typically a clean-coat layer which, after removal of the printed spectacle lens, constitutes the outer layer of one of the surfaces of the spectacle lens. It is thus possible in a very simple manner to produce a spectacle lens which is already covered with a desired coating on a surface. It will be self-evident here that the substrate must be printed with a layer sequence corresponding to the reverse sequence of the coating as subsequently desired on the spectacle lens. Any residues of the detachable bonding layer optionally present that remain on the resulting coated spectacle lens can be removed with a cleaning method. The detachable bonding layer may also be referred to as release layer.

The precoated substrate may be in convex or concave form. The surface topography of the precoated substrate may be selected from the group consisting of spherical, aspherical, toric, atoric, progressive and planar. Alternatively, the surface topography of the precoated substrate may be configured as a symmetric free-form face or as an unsymmetric free-form face.

In an exemplary embodiment of the disclosure, the surface topography of the precoated substrate is spherical. The slice-by-slice construction of the spectacle lens of the disclosure with a 3D printing method allows that surface of the spectacle lens which is opposite the surface adjoining the spherical substrate to have an individual construction.

In an exemplary embodiment of the disclosure, the radius of curvature of the precoated substrate is typically within a range from 10 mm to infinity, further typically within a range from 20 mm to 1600 mm, further typically within a range from 35 mm to 1535 mm, further typically within a range from 56 mm to 600 mm, more typically within a range from 66 mm to 481 mm and most typically within a range from 75 mm to 376 mm. A radius of curvature of the precoated substrate of infinity corresponds here to a planar surface. In the case of nonspherical surfaces of the precoated substrate, the above-specified radii of curvature are each based on an approximate spherical form.

The terms "layer" and "coating" are used interchangeably in the context of this disclosure.

The substrate may have been manufactured, for example, from polytetrafluoroethylene, glass or metal. In an exemplary embodiment, the substrate may have a release layer comprising alkyltrihalosilanes, typically $C_{12}$ to $C_{22}$ alkyltrichlorosilanes and very typically octadecyltrichlorosilane. Alternatively, the release layer or detachable bonding layer used may also be a clean-coat layer. Further alternatively, the release layer or detachable bonding layer may be applied by plasma-induced gas phase deposition of a siloxane layer on the substrate. Typically, the release layer or detachable bonding layer is deposited from a hexamethyldisiloxane-containing gas phase on the substrate.

The precoated substrate may have been coated with at least one layer selected from the group consisting of at least one hard lacquer layer, at least one antireflection layer, at least one electrically conductive or semiconductive layer, at least one antifog layer and/or at least one clean-coat layer. Typically, the precoated substrate has been covered with at least one antireflection layer, at least one hard lacquer layer and at least one clean-coat layer.

If the substrate comprises a hard lacquer layer, it typically comprises a composition for the production of a coating having high bond strength and high scratch resistance, as described, for example, in EP 2 578 649 A1, especially in claim 1 of EP 2 578 649 A1.

If the substrate comprises at least one antireflection layer, it typically comprises alternating discrete metal oxide, metal hydroxide and/or metal oxide hydrate layers composed of or comprising aluminum, silicon, zirconium, titanium, yttrium, tantalum, neodymium, lanthanum, niobium, and/or praseodymium.

In an exemplary embodiment, the at least one antireflection layer of the spectacle lens has a total layer thickness from a range from 97 nm to 2000 nm, typically from a range from 112 nm to 1600 nm, further typically from a range of 121 nm to 1110 nm, more typically from a range of 132 nm to 760 nm and most typically from a range of 139 nm to 496 nm. The antireflection layer here typically comprises a metal oxide, metal hydroxide and/or metal oxide hydrate layer composed of or comprising silicon, which typically forms the outermost layer of the antireflection layer and hence should be applied closest to the substrate.

If the substrate comprises at least one electrically conductive or semiconductive layer, it may comprise, for example, a layer composed of or comprising indium tin oxide $(((In_2O_3)_{0.9} (SnO_2)_{0.1}$; ITO), fluorine tin oxide $(SnO_2$: F; FTO), aluminium zinc oxide (ZnO:Al; AZO) and/or antimony tin oxide $(SnO_2$:Sb; ATO). Typically, the electrically conductive or semiconductive layer comprises a layer composed of or comprising ITO or composed of or comprising FTO. The electrically conductive or semiconductive layer may be present as a constituent of the antireflection layer.

If the substrate comprises an at least antifog layer, it typically comprises a silane derivative according to EP 2 664 659 A1, more typically according to claim 4 of EP 2 664 659 A1. Alternatively, the antifog layer may also be produced by the process described in DE 10 2015 209 794, especially by the process described in claim 1 of DE 10 2015 209 794.

If the substrate comprises at least one clean-coat layer, it typically comprises a material having oleophobic and hydrophobic properties, as disclosed, for example, in EP 1 392 613 A1, on which water assumes a contact angle of more than 90°, typically of more than 100° and more typically more than 110°. The clean-coat layer typically comprises an organofluorine layer with covalent attachment to the substrate according to DE 198 48 591 A1, claim 1, or a layer based on perfluoropolyethers.

The substrate can be coated with a PVD method and/or a spin-coating method; the coating with the at least one antireflection layer is typically effected with a PVD method.

Typically into the layer sequence of the layers present on the substrate proceeding from the substrate as follows:

a) optionally a detachable bonding layer, b) at least one clean-coat layer and/or at least one antifog layer, c) at least one antireflection layer, d) optionally at least one electrically conductive or semiconductive layer, e) at least one hard lacquer layer.

The electrically conductive or semiconductive layer may be part of the antireflection layer.

The surface of the spectacle lens not facing the substrate may likewise have been covered with the layers listed above. In this case, proceeding from the surface of the spectacle lens opposite the substrate, the following layer sequence is typical:

a) at least one hard lacquer layer, b) optionally at least one electrically conductive or semiconductive layer, c) at least one antireflection layer, d) optionally at least one clean-coat layer and/or at least one antifog layer.

Here too, the electrically conductive or semiconductive layer may be part of the antireflection layer.

The printing ink usable for printing of the spectacle lens, typically 3D printing ink, comprises at least one radiation-curable component, optionally at least one colorant, optionally at least one UV initiator, optionally at least one solvent and optionally at least one additive.

The radiation-curable component, typically UV-curable component, typically comprises (meth)acrylate monomers, epoxy monomers, vinyl and allyl monomers, more typically (meth)acrylate monomers. The (meth)acrylate monomers may typically be monofunctional, difunctional, trifunctional and/or tetrafunctional (meth)acrylate monomers. The epoxy monomers may typically be monofunctional, difunctional, trifunctional and/or tetrafunctional epoxy monomers. The vinyl and allyl monomers may typically be monofunctional, difunctional, trifunctional and/or tetrafunctional vinyl and allyl monomers.

In an exemplary embodiment, the monofunctional (meth)acrylate monomers, epoxy monomers, vinyl monomers and allyl monomers usable as radiation-curable component, typically UV-curable component, typically have a viscosity from a range from 0.5 mPa·s to 30.0 mPa·s, more typically from a range from 1.0 mPa·s to 25.0 mPa·s and most typically from a range from 1.5 mPa·s to 20.0 mPa·s.

In an exemplary embodiment, the difunctional (meth)acrylate monomers, epoxy monomers, vinyl monomers and allyl monomers usable as radiation-curable component, typically UV-curable component, typically have a viscosity from a range from 1.5 mPa·s to 17.0 mPa·s, more typically from a range from 2.5 mPa·s to 14.0 mPa·s and most typically from a range from 3.0 mPa·s to 11.0 mPa·s.

In an exemplary embodiment, the trifunctional (meth)acrylate monomers, epoxy monomers, vinyl monomers and allyl monomers usable as radiation-curable component, typically UV-curable component, typically have a viscosity from a range from 20.0 mPa·s to 110.0 mPa·s, more typically from a range from 22.0 mPa·s to 90.0 mPa·s and most typically from a range from 24.0 mPa·s to 83.0 mPa·s.

In an exemplary embodiment, the tetrafunctional (meth)acrylate monomers, epoxy monomers, vinyl monomers and allyl monomers usable as radiation-curable component, typically UV-curable component, typically have a viscosity from a range from 60.0 mPa·s to 600.0 mPa·s, more typically from a range from 70.0 mPa·s to 460.0 mPa·s and most typically from a range from 80.0 mPa·s to 270.0 mPa·s.

The viscosity of the (meth)acrylate monomers, epoxy monomers, vinyl monomers and allyl monomers is typically measured in each case with a Malvern C-VOR 150 rheometer with a specified angular velocity of 5.2 rad/sec at 25° C.

The respective (meth)acrylate monomers, epoxy monomers, vinyl monomers and allyl monomers can each be adjusted to the desired viscosity, for example, by addition of at least one solvent.

The viscosity of the printing ink, typically 3D printing ink, can be adjusted, for example, by mixing different (meth)acrylate monomers, epoxy monomers, vinyl monomers and/or allyl monomers, for example by mixing monofunctional (meth)acrylate monomers, epoxy monomers, vinyl monomers and/or allyl monomers and difunctional (meth)acrylate monomers, epoxy monomers, vinyl monomers and/or allyl monomers and/or trifunctional (meth)acrylate monomers, epoxy monomers, vinyl monomers and/or allyl monomers. Alternatively or additionally to the mixing of different (meth)acrylate monomers, epoxy monomers, vinyl monomers and/or allyl monomers, the viscosity can be adjusted by addition of at least one solvent.

Monofunctional (meth)acrylate monomers used may, for example, be acrylic acid (CAS No. 79-10-7), methacrylic acid (CAS No. 79-41-4), methyl acrylate (CAS No. 96-33-3), methyl methacrylate (CAS No. 80-62-6), ethyl acrylate (CAS No. 140-88-5), ethyl methacrylate (CAS No. 97-63-2), ethyl 2-ethylacrylate (CAS No. 3070-65-3), (2,2-dimethyl-1,3-dioxolan-4-yl)methyl methacrylate (CAS No. 7098-80-8), 2-phenoxyethyl acrylate (CAS No. 48145-04-6), isobornyl acrylate (CAS No. 5888-33-5), 2-(2-methoxyethoxy)ethyl methacrylate (CAS No. 45103-58-0), 4-acryloylmorpholine (CAS No. 5117-12-4), dodecyl acrylate (CAS No. 2156-97-0), isodecyl acrylate (CAS No. 1330-61-6), decyl acrylate (CAS No. 2156-96-9), n-octyl acrylate (CAS No. 2499-59-4), isooctyl acrylate (CAS No. 29590-42-9), octadecyl acrylate (CAS No. 4813-57-4), tetrahydrofurfuryl acrylate (CAS No. 2399-48-6), 2-(2-ethoxyethoxy)ethyl acrylate (CAS No. 7328-17-8), 4-tert-butylcyclohexyl acrylate (CAS No. 84100-23-2), methoxypoly(ethylene glycol) monoacrylate (CAS No. 32171-39-4), phenoxypolyethylene glycol acrylate (CAS No. 56641-05-5), mono-2-(acryloyloxy)ethyl succinate (CAS No. 50940-49-3), allyl methacrylate (CAS No. 96-05-9) or mixtures thereof.

Monofunctional (meth)acrylate monomers used are typically acrylic acid, methacrylic acid, methyl acrylate, methyl methacrylate, ethyl acrylate, ethyl methacrylate, 2-phenoxyethyl acrylate, dodecyl acrylate or mixtures thereof, more typically methacrylic acid, methyl methacrylate, ethyl methacrylate or mixtures thereof.

Difunctional (meth)acrylate monomers used may, for example, be ethylene glycol diacrylate (CAS No. 2274-11-5), diethylene glycol diacrylate (CAS No. 2274-11-5), triethylene glycol diacrylate (CAS No. 1680-21-3), tetraethylene glycol diacrylate (CAS No. 17831-71-9), ethylene glycol dimethacrylate (CAS No. 97-90-5), diethylene glycol dimethacrylate (CAS No. 2358-84-1), triethylene glycol dimethacrylate (CAS No. 109-16-0), tetraethylene glycol dimethacrylate (CAS No. 109-17-1), polyethylene glycol 200 dimethacrylate (CAS No. 25852-47-2), dipropylene glycol diacrylate (CAS No. 57472-68-1), tripropylene glycol diacrylate (CAS No. 42978-66-5), butane-1,3-diol diacrylate (CAS No. 19485-03-1), butane-1,4-diol diacrylate (CAS No. 1070-70-8), hexane-1,6-diol diacrylate (CAS No. 13048-33-4), neopentyl glycol diacrylate (CAS No. 2223-82-7), butane-1,3-diol dimethacrylate (CAS No. 1189-08-8), butane-1,4-diol dimethacrylate (CAS No. 2082-81-7), hexane-1,6-diol dimethacrylate (CAS No. 6606-59-3) or mixtures thereof.

Difunctional (meth)acrylate monomers used are typically polyethylene glycol 200 dimethacrylate, ethylene glycol dimethacrylate, diethylene glycol dimethacrylate, butane-1, 4-diol dimethacrylate or mixtures thereof, more typically ethylene glycol dimethacrylate, diethylene glycol dimethacrylate or mixtures thereof.

Trifunctional (meth)acrylate monomers used may, for example, be trimethylolpropane trimethacrylate (CAS No. 3290-92-4), trimethylolpropane triacrylate (CAS No. 15625-89-5), pentaerythritol triacrylate (CAS No. 3524-68-3), pentaerythritol propoxylate triacrylate (CAS No. 145611-81-0), trimethylolpropane propoxylate triacrylate (CAS No. 53879-54-2), trimethylolpropane ethoxylate triacrylate (CAS No. 28961-43-5) or mixtures thereof.

Trifunctional (meth)acrylate monomers typically used are trimethylolpropane trimethacrylate, pentaerythritol triacrylate or mixtures thereof, more typically trimethylolpropane trimethacrylate.

Tetrafunctional (meth)acrylate monomers used may, for example, be di(trimethylolpropane) tetraacrylate (CAS No. 94108-97-1), pentaerythritol tetraacrylate (CAS No. 4986-89-4), pentaerythritol tetramethacrylate (CAS No. 3253-41-6) or mixtures thereof.

Tetrafunctional (meth)acrylate monomers used are typically di(trimethylolpropane) tetraacrylate, pentaerythritol tetramethacrylate or mixtures thereof, more typically di(trimethylolpropane) tetraacrylate.

Monofunctional epoxy monomers used may, for example, be ethyl glycidyl ether (CAS No. 4016-11-9), n-butyl glycidyl ether (CAS No. 2426-08-6), 2-ethylhexyl glycidyl ether (CAS No. 2461-15-6), C8-C10 glycidyl ether (CAS No. 68609-96-1), C12-C14 glycidyl ether (CAS No. 68609-97-2), cresyl glycidyl ether (CAS No. 2210-79-9), p-tert-butylphenyl glycidyl ether (CAS No. 3101-60-8), nonylphenyl glycidyl ether (CAS No. 147094-54-0), benzyl glycidyl ether (CAS No. 2930-05-4), phenyl glycidyl ether (CAS No. 122-60-1), bisphenol A 2,3-dihydroxypropyl glycidyl ether (CAS No. 76002-91-0) or mixtures thereof.

Monofunctional epoxy monomers used are typically ethyl glycidyl ether, n-butyl glycidyl ether, 2-ethylhexyl glycidyl ether or mixtures thereof, more typically ethyl glycidyl ether, n-butyl glycidyl ether or mixtures thereof.

Difunctional epoxy monomers used may, for example, be diglycidyl ether (CAS No. 2238-07-5), ethylene glycol diglycidyl ether (CAS No. 2224-15-9), diethylene glycol diglycidyl ether (CAS No. 4206-61-5), propylene glycol diglycidyl ether (CAS No. 16096-30-3), dipropylene glycol diglycidyl ether (CAS No. 41638-13-5), butane-1,4-diol diglycidyl ether (CAS No. 2425-79-8), cyclohexane-1,4-dimethanol diglycidyl ether (CAS No. 14228-73-0), neopentyl glycol diglycidyl ether (CAS No. 17557-23-2), polypropylene glycol(400) diglycidyl ether (CAS No. 26142-30-3), hexane-1,6-diol diglycidyl ether (CAS No. 16096-31-4), bisphenol A diglycidyl ether (CAS No. 1675-54-3), bisphenol A propoxylate diglycidyl ether (CAS No. 106100-55-4), polyethylene glycol diglycidyl ether (CAS No. 72207-80-8), glycerol diglycidyl ether (CAS No. 27043-36-3), resorcinol diglycidyl ether (CAS No. 101-90-6) or mixtures thereof in the printing ink of the disclosure, typically 3D printing ink.

Difunctional epoxy monomers used are typically diglycidyl ether, ethylene glycol diglycidyl ether, diethylene glycol diglycidyl ether, butane-1,4-diol diglycidyl ether, polyethylene glycol diglycidyl ether, polypropylene glycol (400) diglycidyl ether or mixtures thereof, more typically ethylene glycol diglycidyl ether, diethylene glycol diglycidyl ether, butane-1,4-diol diglycidyl ether, polyethylene glycol diglycidyl ether or mixtures thereof.

Trifunctional epoxy monomers used may, for example, be trimethylolethane triglycidyl ether (CAS No. 68460-21-9), trimethylolpropane triglycidyl ether (CAS No. 30499-70-8), triphenylolmethane triglycidyl ether (CAS No. 66072-38-6), tris(2,3-epoxypropyl) isocyanurate (CAS No. 2451-62-9), tris(4-hydroxyphenyl)methane triglycidyl ether (CAS No. 66072-38-6), 1,1,1-tris(4-hydroxyphenyl)ethane triglycidyl ether (CAS No. 87093-13-8), glycerol triglycidyl ether (CAS No. 13236-02-7), glycerol propoxylate triglycidyl ether (CAS No. 37237-76-6), N,N-diglycidyl-4-glycidyloxyaniline (CAS No. 5026-74-4) or mixtures thereof.

Trifunctional epoxy monomers used are typically trimethylolpropane triglycidyl ether, tri s(2,3-epoxypropyl) isocyanurate, glycerol triglycidyl ether, glycerol propoxylate triglycidyl ether or mixtures thereof, more typically tris(2, 3-epoxypropyl) isocyanurate, glycerol triglycidyl ether or mixtures thereof.

Tetrafunctional epoxy monomers used may, for example, be pentaerythritol tetraglycidyl ether (CAS No. 3126-63-4), dipentaerythritol tetraglycidyl ether, tetraglycidylbenzylethane, sorbitol tetraglycidyl ether, tetraglycidyldiaminophenylmethane, tetraglycidylbisaminomethyl-cyclohexane or mixtures thereof.

Tetrafunctional epoxy monomers used are typically pentaerythritol tetraglycidyl ether (CAS No. 3126-63-4), dipentaerythritol tetraglycidyl ether, sorbitol tetraglycidyl ether or mixtures thereof, more typically pentaerythritol tetraglycidyl ether (CAS No. 3126-63-4), dipentaerythritol tetraglycidyl ether or mixtures thereof.

If the radiation-curable component of the printing ink, typically 3D printing ink, comprises monofunctional vinyl monomers, these may comprise, for example, ethylene glycol vinyl ether (CAS No. 764-48-7), di(ethylene glycol) vinyl ether (CAS No. 929-37-3), 1-vinylcyclohexanol (CAS No. 1940-19-8), vinyl acetate (CAS No. 108-05-4), vinyl chloride (CAS No. 75-01-4), ethyl vinyl ketone (CAS No. 1629-58-9), butyl vinyl ether (CAS No. 111-34-2), butane-1,4-diol vinyl ether (CAS No. 17832-28-9), vinyl acrylate (CAS No. 2177-18-6), vinyl methacrylate (CAS No. 4245-37-8), isobutyl vinyl ether (CAS No. 109-53-5), vinyl pivalate (CAS No. 3377-92-2), vinyl benzoate (CAS No. 769-78-8), vinyl valerate (CAS No. 5873-43-8), 2-ethylhexyl vinyl ether (CAS No. 103-44-6), phenyl vinyl ether (CAS No. 766-94-9), tert-butyl vinyl ether (CAS No. 926-02-3), cyclohexyl vinyl ether (CAS No. 2182-55-0), dodecyl vinyl ether (CAS No. 765-14-0), ethyl vinyl ether (CAS No. 109-92-2), propyl vinyl ether (CAS No. 764-47-6), cyclohexane-1,4-dimethanol vinyl ether (CAS No. 114651-37-5) or mixtures thereof.

Monofunctional vinyl monomers used are typically ethylene glycol vinyl ether, di(ethylene glycol) vinyl ether, ethyl vinyl ketone, vinyl acetate, phenyl vinyl ether, cyclohexyl vinyl ether or mixtures thereof, more typically ethyl vinyl ketone, vinyl acetate, ethylene glycol vinyl ether or mixtures thereof.

Difunctional vinyl monomers used may, for example, be di(ethylene glycol) divinyl ether (CAS No. 764-99-8), tri (ethylene glycol) divinyl ether (CAS No. 765-12-8), tetra (ethylene glycol) divinyl ether (CAS No. 83416-06-2), poly (ethylene glycol) divinyl ether (CAS No. 50856-26-3), tri (ethylene glycol) divinyl ether (CAS No. 765-12-8), divinylbenzene (CAS No. 1321-74-0), butane-1,4-diol divinyl ether (CAS No. 3891-33-6), hexane-1,6-diol divinyl ether (CAS No. 19763-13-4), cyclohexane-1,4-dimethanol divinyl ether (CAS No. 17351-75-6), 1,4-pentadien-3-ol (CAS No. 922-65-6) or mixtures thereof.

Difunctional vinyl monomers used are typically di(ethylene glycol) divinyl ether, cyclohexane-1,4-dimethanol divinyl ether, poly(ethylene glycol) divinyl ether, divinylbenzene or mixtures thereof, more typically cyclohexane-1,4- dimethanol divinyl ether, divinylbenzene, di(ethylene glycol) divinyl ether or mixtures thereof, as radiation-curable component in the printing ink, typically 3D printing ink.

Trifunctional or tetrafunctional vinyl monomers used may, for example, be 1,3,5-trivinylbenzene, 1,2,4-trivinylcyclohexane (CAS No. 2855-27-8), 1,3,5-trivinyl-1,3,5-triazinane-2,4,6-trione, 1,3,5-trivinyl-1,3,5-trimethylcyclotrisiloxane (CAS No. 3901-77-7), 2,4,6-trimethyl-2,4,6-trivinylcyclotrisilazane (CAS No. 5505-72-6), 2,4,6-trivinylcyclotriboroxane pyridine complex (CAS No. 442850-89-7), tetravinylsilane (CAS No. 1112-55-6), 2,4,6,8-tetramethyl-2,4,6,8-tetravinylcyclotetrasiloxane (CAS No. 2554-06-5) or mixtures thereof.

Trifunctional or tetrafunctional vinyl monomers used are 1,3,5-trivinylbenzene, 1,2,4-trivinylcyclohexane, tetravinylsilane or mixtures thereof, more typically 1,3,5-trivinylbenzene, 1,2,4-trivinylcyclohexane or mixtures thereof.

In addition, the printing ink, typically 3D printing ink, may comprise monofunctional allyl monomers, for example allyl acetate (CAS No. 591-87-7), allyl acetoacetate (CAS No. 1118-84-9), allyl alcohol (CAS No. 107-18-6), allyl benzyl ether (CAS No. 14593-43-2), allyl butyl ether (CAS No. 3739-64-8), allyl butyrate (CAS No. 2051-78-7), allyl ethyl ether (CAS No. 557-31-3), ethylene glycol allyl ether (CAS No. 111-45-5), allyl phenyl ether (CAS No. 1746-13-0), trimethylolpropane allyl ether (CAS No. 682-11-1), 2-allyloxyethanol (CAS No. 111-45-5), 3-allyloxypropane-1,2-diol (CAS No. 123-34-2) or mixtures thereof.

Monofunctional allyl monomers used are typically allyl acetate, allyl alcohol, ethylene glycol allyl ether, allyloxyethanol or mixtures thereof, more typically allyl acetate, allyl alcohol, ethylene glycol allyl ether or mixtures thereof.

Difunctional allyl monomers used may, for example, be allyl ether (CAS No. 557-40-4), 2,2'-diallylbisphenol A (CAS No. 1745-89-7), 2,2'-diallylbisphenol A diacetate ether (CAS No. 1071466-61-9), trimethylolpropane diallyl ether (CAS No. 682-09-7), diallyl carbonate (CAS No. 15022-08-9), diallyl maleate (CAS No. 999-21-3), diallyl succinate (CAS No. 925-16-6), diallyl phthalate (CAS No. 131-17-9), di(ethylene glycol) bis(allylcarbonate) (CAS No. 142-22-3) or mixtures thereof.

Difunctional allyl monomers used are typically allyl ether, 2,2'-diallylbisphenol A, diallyl carbonate, diallyl succinate, di(ethylene glycol) bis(allylcarbonate), diallyl maleate or mixtures thereof, more typically allyl ether, 2,2'-diallylbisphenol A, diallyl carbonate, diethylene glycol diallyl carbonate or mixtures thereof.

Trifunctional or tetrafunctional allyl monomers used may, for example, be 2,4,6-triallyloxy-1,3,5-triazine (CAS No. 101-37-1), 1,3,5-tri allyl-1,3,5-triazine-2,4,6(1H,3H,5H)-trione (CAS No. 1025-15-6), 3-(N, N', N'-triallylhydrazine) propionic acid, pentaerythritol allyl ether (CAS No. 91648-24-7), 1,1,2,2-tetraallyloxyethane (CAS No. 16646-44-9), tetraallyl pyromellitate (CAS No. 13360-98-0) or mixtures thereof.

Trifunctional or tetrafunctional allyl monomers used are typically 2,4,6-triallyloxy-1,3,5-triazine, pentaerythritol allyl ether, 1,3,5-triallyl-1,3,5-triazine-2,4,6(1H,3H,5H)-trione or mixtures thereof, more typically 2,4,6-triallyloxy-1,3,5-triazine, pentaerythritol allyl ether or mixtures thereof.

According to the disclosure, the selection of radiation-curing components to be used is made in such a way that sufficiently crosslinkable but nevertheless rapidly curable monomer mixtures can be obtained.

The total proportion of at least one radiation-curable component in the printing ink, typically 3D printing ink, is typically within a range from 11.0% by weight to 99.5% by weight, further typically within a range from 17% by weight to 99% by weight, more typically within a range from 31% by weight to 98.5% by weight and most typically within a range from 40% by weight to 98% by weight, based in each case on the total weight of the printing ink, typically 3D printing ink. The above-listed ranges are applicable both to the use of exclusively monofunctional, exclusively difunctional, exclusively trifunctional, exclusively tetrafunctional radiation-curable components and to the use of mixtures of radiation-curable components selected from the group consisting of monofunctional, difunctional, trifunctional and tetrafunctional radiation-curable components. The above-listed ranges are also applicable both to the use of exclusively (meth)acrylate monomers, epoxy monomers, vinyl monomers or allyl monomers and to the use of mixtures thereof. For example, at least one monofunctional (meth)acrylate monomer may be present in a mixture with at least one trifunctional epoxy monomer.

The total proportion of at least one kind of monofunctional (meth)acrylate monomer, epoxy monomer, vinyl monomer or allyl monomer in the printing ink, typically 3D printing ink, is typically within a range from 0.0% by weight to 60.0% by weight, further typically within a range from 0.3% by weight to 51.0% by weight, more typically within a range from 1.2% by weight to 44.0% by weight and most typically within a range from 1.8% by weight to 35.0% by weight, based in each case on the total weight of the printing ink, typically 3D printing ink. The aforementioned ranges are applicable both to the use of one kind of monofunctional (meth)acrylate monomer, epoxy monomer, vinyl monomer or allyl monomer and to the use of a mixture of different monofunctional (meth)acrylate monomers, epoxy monomers, vinyl monomers or allyl monomers. For example, at least one kind of monofunctional (meth)acrylate monomer may be present in a mixture in each case with at least one kind of monofunctional allyl monomer, or at least one kind of monofunctional (meth)acrylate monomer with at least one different kind of monofunctional (meth)acrylate monomer.

In an exemplary embodiment, the printing ink, typically 3D printing ink, does not comprise any monofunctional (meth)acrylate monomer, epoxy monomer, vinyl monomer or allyl monomer.

The total proportion of at least one kind of difunctional (meth)acrylate monomer, epoxy monomer, vinyl monomer or allyl monomer in the printing ink, typically 3D printing ink, is typically within a range from 32.0% by weight to 99.0% by weight, further typically within a range from 39.0% by weight to 97.0% by weight, more typically within a range from 47.0% by weight to 95.0% by weight and most typically within a range from 56.0% by weight to 93.0% by weight, based in each case on the total weight of the printing ink, typically 3D printing ink. The aforementioned ranges are applicable both to the use of one kind of difunctional (meth)acrylate monomer, epoxy monomer, vinyl monomer or allyl monomer and to the use of a mixture of different difunctional (meth)acrylate monomers, epoxy monomers, vinyl monomers or allyl monomers. For example, at least one kind of difunctional (meth)acrylate monomer may be present in a mixture with at least one kind of difunctional epoxy monomer, or there may be a mixture of two different kinds of monofunctional (meth)acrylate monomers.

The total proportion of at least one kind of trifunctional (meth)acrylate monomer, epoxy monomer, vinyl monomer or allyl monomer in the printing ink, typically 3D printing ink, is typically within a range from 1.0% by weight to 51.0% by weight, further typically within a range from 2.0% by weight to 43.0% by weight, more typically within a range from 3.0% by weight to 36.0% by weight and most typically within a range from 4.0% by weight to 31.0% by weight, based in each case on the total weight of the printing ink, typically 3D printing ink. The aforementioned ranges are applicable both to the use of one kind of trifunctional (meth)acrylate monomer, epoxy monomer, vinyl monomer or allyl monomer and to the use of a mixture of different trifunctional (meth)acrylate monomers, epoxy monomers, vinyl monomers or allyl monomers. For example, at least one kind of trifunctional (meth)acrylate monomer may be present in a mixture in each case with at least one kind of trifunctional vinyl monomer, or at least one kind of trifunctional (meth)acrylate monomer with at least one different kind of trifunctional (meth)acrylate monomer.

The total proportion of at least one kind of tetrafunctional (meth)acrylate monomer, epoxy monomer, vinyl monomer or allyl monomer in the printing ink, typically 3D printing ink, is typically within a range from 0% by weight to 16% by weight, further typically within a range from 0% to 13% by weight, more typically within a range from 0.1% by weight to 9% by weight and most typically within a range from 0.4% by weight to 4% by weight, based in each case on the total weight of the printing ink, typically 3D printing ink. The aforementioned ranges are applicable both to the use of one kind of tetrafunctional (meth)acrylate monomer, epoxy monomer, vinyl monomer or allyl monomer and to the use of a mixture of different tetrafunctional (meth)acrylate monomers, epoxy monomers, vinyl monomers or allyl monomers. For example, at least one kind of tetrafunctional (meth)acrylate monomer may be present in a mixture with at least one other, different kind of tetrafunctional (meth)acrylate monomer, or there may be a mixture of at least one kind of tetrafunctional (meth)acrylate monomer with at least one kind of tetrafunctional allyl monomer.

In an exemplary embodiment, the printing ink, typically 3D printing ink, comprises at least one monofunctional radiation-curable component and at least one difunctional radiation-curable component typically in a weight ratio of 1:1, more typically in the weight ratio of 1:5 and most typically in a weight ratio of 1:10.

In a further exemplary embodiment, the printing ink, typically 3D printing ink, comprises at least one monofunctional radiation-curable component and at least one trifunctional radiation-curable component typically in a weight ratio of 1:5, more typically in the weight ratio of 1:3 and most typically in a weight ratio of 1:1.

In a further exemplary embodiment, the printing ink, typically 3D printing ink, comprises at least one difunctional radiation-curable component and at least one trifunctional radiation-curable component in a weight ratio of 1:1, more typically in the weight ratio of 5:1 and most typically in a weight ratio of 8:1.

In a further exemplary embodiment, the printing ink, typically 3D printing ink, comprises at least one difunctional radiation-curable component and at least one tetrafunctional radiation-curable component in a weight ratio of 5:1, more typically in the weight ratio of 10:1 and most typically in a weight ratio of 20:1.

In a further exemplary embodiment, the printing ink, typically 3D printing ink, comprises at least one monofunctional radiation-curable component and at least one difunctional radiation-curable component and at least one trifunctional radiation-curable component in a weight ratio of 1:5:1, more typically in the weight ratio of 2:13:0.5 and most typically in a weight ratio of 2:18:0.3.

In a particular exemplary embodiment, the printing ink, typically 3D printing ink, comprises, as radiation-curable component, at least one kind of difunctional (meth)acrylate monomer and at least one kind of trifunctional (meth)acrylate monomer, where the viscosity of the printing ink of the disclosure, typically 3D printing ink, is ≤50 mPa·s, typically within a range from 5 mPa·s to 33 mPa·s, further typically within a range from 7 mPa·s to 27 mPa·s, more typically within a range from 9 mPa·s to 23 mPa·s and most typically within a range from 11 mPa·s to 21 mPa·s.

In a further exemplary embodiment, the printing ink, typically 3D printing ink, comprises, as radiation-curable component, at least one kind of difunctional epoxy monomer and at least one kind of trifunctional epoxy monomer, where the viscosity of the printing ink of the disclosure, typically 3D printing ink, is ≤53 mPa·s, typically within a range from 4 mPa·s to 31 mPa·s, further typically within a range from 6 mPa·s to 28 mPa·s, more typically within a range from 9 mPa·s to 22 mPa·s and most typically within a range from 10 mPa·s to 20 mPa·s.

In an exemplary embodiment, the printing ink, typically 3D printing ink, comprises at least one UV initiator. The printing ink of the disclosure, typically 3D printing ink, may comprise, for example, benzophenone (CAS No. 119-61-9), 2-methylbenzophenone (CAS No. 131-58-8), 4-methylbenzophenone (CAS No. 134-84-9), 4,4'-bis(dimethylamino) benzophenone (CAS No. 90-94-8), benzoin (CAS No. 119-53-9), benzoin methyl ether (CAS No. 3524-62-7), benzoin isopropyl ether (CAS No. 6652-28-4), 2,2-dimethoxy-1,2-diphenylethan-1-one (CAS No. 24650-42-8), phenylbis(2,4,6-trimethylbenzoyl)phosphine oxide (CAS No. 162881-26-7), ethyl 2,4,6-trimethylbenzoylphenylphosphinate (CAS No. 84434-11-7), 2-methyl-1-[4-(methylthio)phenyl]-2-(4-morpholinyl)-1-propanone (CAS No. 71868-10-5), 2-hydroxy-2-methyl-1-phenyl-1-propanone (CAS No. 7473-98-5), 2-(dim ethyl amino)-1-(4-(4-morpholinyl)phenyl)-2-(phenylmethyl)-1-butanone (CAS No. 119313-12-1), diphenyl(2,4,6-trimethylbenzoyl)phosphine oxide (CAS No. 75980-60-8), triarylsulfonium hexafluorophosphate salts (CAS No. 109037-77-6), triarylsulfonium hexafluoroantimonate salts (CAS No. 109037-75-4) or mixtures thereof as UV initiator. The printing ink of the disclosure, typically 3D printing ink, typically comprises benzophenone, 2,2-dimethoxy-1,2-diphenylethan-1-one, phenylbis(2,4,6-trimethylbenzoyl)-phosphine oxide, diphenyl(2,4,6-trimethylbenzoyl)phosphine oxide, triarylsulfonium hexafluoro-phosphate salts or mixtures thereof, more typically 2,2-dimethoxy-1,2-diphenylethan-1-one, phenylbis(2,4,6-trimethylbenzoyl)phosphine oxide, diphenyl(2,4,6-trimethylbenzoyl)phosphine oxide or mixtures thereof as UV initiator.

The printing ink, typically 3D printing ink, comprises the at least one UV initiator in a total proportion from a range from typically 0.01% by weight to 3.7% by weight, more typically from a range from 0.1% by weight to 2.1% by weight and most typically from a range from 0.3% by weight to 1.7% by weight, based in each case on the total weight of the printing ink, typically 3D printing ink.

In an exemplary embodiment, the at least one UV initiator may be used together with a coinitiator. Coinitiators are typically added whenever the UV initiator requires a second molecule to form a free radical active in the UV range. For example, benzophenone requires a second molecule, for example an amine, e.g. triethylamine, methyldiethanolamine or triethanolamine, in order to produce a free-radical after absorption of UV light.

The optionally at least one solvent in the printing ink, typically 3D printing ink, may be selected from the group consisting of alcohols, ketones, esters, ethers, thioethers, amides, hydrocarbons, amines and mixtures thereof. Typically, the optionally at least one solvent is selected from the group consisting of alcohols, ketones, esters and mixtures thereof. In the context of this disclosure, a solvent may firstly be one kind of solvent, and secondly a solvent mixture.

Examples of alcohols usable as solvent are methanol, ethanol, propanol, isopropanol, butanol, pentanol, hexanol or mixtures thereof.

Examples of solvents usable as ketones are acetone, methyl ethyl ketone, cyclohexanone, diisobutyl ketone, methyl propyl ketone, diacetone alcohol or mixtures thereof.

Examples of esters as usable solvents are methyl acetate, ethyl acetate, 1-methoxy-2-propyl acetate, n-propyl acetate, i-propyl acetate, ethoxypropyl acetate, butyl acetate, methyl propionate, ethyl propionate, glycol ether acetates, butyl glycol acetate, propylene glycol diacetate, ethyl lactate or mixtures thereof.

Examples of ethers as usable solvents are diethyl ether, dipropyl ether, tetrahydrofuran, ethylene glycol ethyl ether, ethylene glycol methyl ether, triethylene glycol butyl ether, tetraethylene glycol methyl ether, tetraethylene glycol butyl ether, dipropylene glycol dimethyl ether, propylene glycol butyl ether, 1-methoxy-2-propanol, 3-methoxy-3-methyl-1-butanol or mixtures thereof.

Examples of amides as usable solvents are dimethylacetamide, dimethylformamide, formamide, N-methylformamide, N-methylpyrrolidone, and 2-pyrrolidone.

Examples of hydrocarbons as usable solvents are terpenes, such as pinene, limonene or terpinolene, aliphatic hydrocarbons such as hexane, heptane, octane or petroleum spirit, aromatic hydrocarbons such as toluene, or xylene.

In an exemplary embodiment, the optionally at least one solvent in the printing ink, especially 3D printing ink, is selected from the group consisting of isopropanol, ethanol, butanol, diisobutyl ketone, butylglycol, butylglycol acetate, propylene glycol diacetate, dipropylene glycol dimethyl ether, ethyl lactate, ethoxypropyl acetate and mixtures thereof.

In an exemplary embodiment, the optionally at least one solvent has a flashpoint of at least 61° C.

In an exemplary embodiment, the proportion of the at least one solvent optionally present in the printing ink, typically 3D printing ink, is within a range from 0% by weight to 10% by weight, typically within a range from 0% by weight to 7.7% by weight, more typically within a range from 0.1% by weight to 6.3% by weight and most typically within a range from 0.1% by weight to 5.2% by weight, based in each case on the total weight of the printing ink, typically 3D printing ink. In a particular exemplary embodiment, the printing ink, typically 3D printing ink, does not comprise any solvent.

The printing ink, particularly 3D printing ink, typically has a surface tension from a range from 10 mN/m to 80 mN/m, more typically from a range from 15 mN/m to 40 mN/m and most typically from a range from 18 mN/m to 35 mN/m. If the surface tension is below 10 mN/m, the droplets at the printhead become too large for the desired application. If the surface tension is above 80 mN/m, there is no formation of defined droplets of the printing ink at the printhead. Surface tension is typically determined at a temperature of 25° C. with the Kruss DSA 100 instrument and the pendant drop method.

The viscosity of the printing ink, typically 3D printing ink, is typically within a range from 4 mPa·s to 56 mPa·s, further typically within a range from 7 mPa·s to 45 mPa·s, more typically within a range from 9 mPa·s to 34 mPa·s and most typically within a range from 10 mPa·s to 22 mPa·s. Viscosity is typically measured with a Malvern C-VOR 150 rheometer with a specified angular velocity of 5.2 rad/sec at 25° C.

The printing ink, typically 3D printing ink, may comprise at least one colorant. Colorants used may be chromatic or achromatic dyes that are soluble or dispersible in the surrounding medium. Depending on the effect to be achieved and/or on the visual impression to be achieved, colorants used, alternatively or additionally to the dyes, may also be pigments that are insoluble in the surrounding medium. Pigments used are typically effect pigments, such as metal effect pigments or pearlescent pigments, organic and/or inorganic pigments.

Dyes and organic or inorganic pigments used in the printing ink, typically 3D printing ink, are typically those that are also approved in textiles and/or foods.

Suitable organic pigments for use in the printing ink, typically 3D printing ink, include, for example, nitroso, nitro, azo, xanthene, quinoline, anthraquinone, phthalocyanine, metal complex, isoindolinone, isoindoline, quinacridone, perinone, perylene, diketopyrrolopyrrole, thioindigo, dioxazine, triphenylmethane, and quinophthalone compounds.

The dyes or organic pigments usable in the printing ink, typically 3D printing ink, may include, for example, C.I. Disperse Yellow 5, C.I. Disperse Yellow 13, C.I. Disperse Yellow 33, C.I. Disperse Yellow 42, C.I. Disperse Yellow 51, C.I. Disperse Yellow 54, C.I. Disperse Yellow 64, C.I. Disperse Yellow 71, C.I. Disperse Yellow 86, C.I. Disperse Yellow 114, C.I. Disperse Yellow 201, C.I. Disperse Yellow 211, C.I. Disperse Orange 30, C.I. Disperse Orange 73, C.I. Disperse Red 4, C.I. Disperse Red 11, C.I. Disperse Red 15, C.I. Disperse Red 55, C.I. Disperse Red 58, C.I. Disperse Red 60, C.I. Disperse Red 73, C.I. Disperse Red 86, C.I. Disperse Red 91, C.I. Disperse Red 92, C.I. Disperse Red 127, C.I. Disperse Red 152, C.I. Disperse Red 189, C.I. Disperse Red 229, C.I. Disperse Red 279, C.I. Disperse Red 302, C.I. Disperse Red 302:1, C.I. Disperse Red 323, C.I. Disperse Blue 27, C.I. Disperse Blue 54, C.I. Disperse Blue 56, C.I. Disperse Blue 73, C.I. Disperse Blue 280, C.I. Disperse Violet 26, C.I. Disperse Violet 33, C.I. Solvent Yellow 179, C.I. Solvent Violet 36, C.I. Pigment Blue 15, C.I. Pigment Blue 80, C.I. Pigment Green 7, C.I. Pigment Orange 36, C.I. Pigment Orange 36, C.I. Pigment Yellow 13, C.I. Pigment Violet 23, C.I. Pigment Violet 37, C.I. Pigment Black 1, C.I. Pigment Black 6, C.I. Pigment Black 7 or mixtures thereof.

With particularity, the printing ink, typically 3D printing ink, contains one of C.I. Disperse Yellow 42, C.I. Disperse Yellow 201, C.I. Solvent Yellow 179, C.I. Disperse Orange 73, C.I. Disperse Red 279, C.I. Disperse Red 302:1, C.I. Disperse Blue 56, C.I. Solvent Violet 36 or mixtures thereof as dyes or organic pigments.

The total proportion of colorant in the printing ink, typically 3D printing ink, is typically within a range from 0.0% by weight to 66.0% by weight, further typically within a range from 0.01% by weight to 53.1% by weight, more typically within a range from 0.1% by weight to 42.3% by weight and most typically within a range from 0.11% by weight to 27.7% by weight, based in each case on the total weight of the printing ink, typically 3D printing ink. The total proportion of colorant comprises the proportion of all colorants present in the printing ink, typically 3D printing ink, irrespective of whether they are dyes, pigments, mixtures thereof, mixtures of different dyes, mixtures of different pigments etc.

The total proportion of colorant in the spectacle lens of the disclosure is typically within a range from 0.0% by weight to 8.0% by weight, further typically within a range from 0.01% by weight to 8.0% by weight, further typically within a range from 0.0% by weight to 6.0% by weight, more typically within a range from 0.01% by weight to 4.0% by weight and most typically within a range from 0.05% by weight to 2.0% by weight, based in each case on the total weight of the spectacle lens. The total proportion of colorant comprises the proportion of all colorants in the spectacle lens, irrespective of whether they are dyes or pigments, mixtures of different dyes or mixtures of different pigments, mixtures of dyes and pigments, etc.

The printing ink, typically 3D printing ink, is typically produced by mixing all components while stirring, by initially charging the at least one colorant, if present, and first dissolving or dispersing it with a small amount of radiation-curable component and/or solvent and then adding the remaining components.

In an exemplary embodiment, the spectacle lens of the disclosure is constructed unit by unit with a printing ink, typically 3D printing ink, comprising at least one colorant and a printing ink, typically 3D printing ink, without colorant. "Unit by unit" means the arrangement of at least one volume element, typically a multitude of volume elements, of the printing ink, typically 3D printing ink, with the first unit-by-unit arrangement of at least one volume element on the precoated substrate. Typically, the unit-by-unit arrangement of at least one volume element is effected slice by slice. The volume elements are typically bonded with UV light. It is possible here for the printing ink, typically 3D printing ink, that comprises the colorant to comprise at least one radiation-curable component other than the radiation-curable component of the printing ink, typically 3D printing ink, without colorant. Typically, the at least one radiation-curable component of the printing ink, typically 3D printing ink, comprising at least one colorant is selected such that the at least one radiation-curable component is compatible both with the at least one colorant and with the at least one radiation-curable component of the printing ink, typically 3D printing ink, without colorant. Further typically, the at least one radiation-curable component of the printing ink, typically 3D printing ink, comprising at least one colorant prevents diffusion of the colorant into the printing ink, typically 3D printing ink, without colorant. In this way, it is possible to arrange very defined color- and/or effect-imparting volume elements within the spectacle lens.

In a further exemplary embodiment of the disclosure, the spectacle lens is printed in accordance with the shape of a spectacle frame, such that there is no need for edging into the spectacle frame. In addition, in this exemplary embodiment, the groove or flute provided for securing in a spectacle frame, for example for Nylor frames, or specific facet forms, for example flat or decorative facets, can already be taken into account in the printing of the spectacle lens. Cutouts or holes as required for frameless spectacles, for example, can remain material-free in this exemplary embodiment, and so subsequent processing steps can be dispensed with here too. In this exemplary embodiment, in the presence of the shape data of the spectacle frame, the at least one color- and/or effect-imparting slice is printed only at those points in the spectacle lens where coloring and/or another effect is desired in the spectacle lens within a spectacle frame.

The printing ink, typically 3D printing ink, may optionally comprise at least one additive. To the printing ink, typically 3D printing ink, may be added, for example, dispersants, antisettling agents, wetting agents, including anticrater or leveling additives, biocides, UV absorbers or mixtures thereof.

Dispersants help to achieve a homogeneous distribution of all solid constituents in the printing ink, typically 3D printing ink. More particularly, possible agglomeration of the pigments is avoided. Dispersants employed may, for example, be Solsperse 20000, Solsperse 32500, each from Avecia K.K., Disperbyk-102, Disperbyk-106, Disperbyk-111, Disperbyk-161, Disperbyk-162, Disperbyk-163, Disperbyk-164, Disperbyk-166, Disperbyk-180, Disperbyk-190, Disperbyk-191 or Disperbyk-192, each from Byk-Chemie GmbH.

Antisettling agents are intended to prevent settling-out, especially of pigments in the printing ink, typically 3D printing ink. Examples of usable antisettling agents are Byk-405 (from Byk-Chemie GmbH) in conjunction with fumed silicon dioxide, modified ureas such as Byk-410, Byk-411, or waxes such as Ceramat 250, Cerafak103, Cerafak 106 or Ceratix 8461, each from Byk-Chemie GmbH.

Wetting agents are important for the function of the printhead since internal structures such as ducts, filters, nozzle supply chambers etc. are also wetted. Examples of suitable wetting agents include fatty acid alkyl esters, acetylene derivatives, fluorinated esters or fluorinated polymers.

Biocides may be added to printing inks, typically 3D printing inks, in order to prevent growth of microorganisms. Biocides used may, for example, be polyhexamethylenebiguanides, isothiazolones, isothiazolinones, for example 5-chloro-2-methyl-4-isothiazolin-3-one, 2-methyl-4-isothiazolin-3-one or mixtures thereof.

The selection of the suitable UV absorber, which has to be compatible with the other components of the printing ink, especially 3D printing ink, and the 3D printing method, and the optimization of the concentration for achievement of a desired UV absorption property can be determined, for example, with the aid of simulation programs, taking account of suitable material databases.

DE 69534779 T2 discloses a selection of suitable UV absorbers for spectacle lenses which can also be used in the printing ink, typically 3D printing ink. Accordingly, the UV absorber may comprise, for example, 2-(2'-hydroxy-5'-methylphenyl)benzotriazole, 2-hydroxy-4-n-acetoxybenzophenone, 2-(2'-hydroxy-5-octylphenyl)benzotriazole, 2-(2"-hydroxy-3',6"-(1,1-dimethylbenzylphenyl)benzotriazole, 2(2'-hydroxy-3',5"-di-t-amylphenyl) benzotriazole, bis[2-hydroxy-5-methyl-3-(benzotriazol-2-yl)phenyl]methane, bis[2-hydroxy-5-t-octyl-3-(benzotriazol-2-yl)phenyl]methane, 2-hydroxy-4-(2-acryloyloxyethoxybenzo-phenone), 2-hydroxy-4-(2-hydroxy-3-methacryloyloxy)propoxybenzophenone, 2,2'-dihydroxy-4-methoxybenzophenone, 2,4-dihydroxybenzophenone, 2,2'-dihydroxy-4,4-dimethoxybenzophenone, 2,2',4,4'-tetrahydroxybenzophenone, ethyl 2-cyano-3,3-diphenylacrylate, 2-ethylhexyl 2-cyano-3,3-diphenylacrylate, 2',2",4-trihydroxy-benzophenone, 2-hydroxy-4-acryloyloxyethoxybenzophenone (polymer), 2-hydroxy-4-acryloyloxyethoxybenzophenone, 4-hydroxy-4-methoxybenzophenone, 2-hydroxy-4-n-octoxybenzophenone or mixtures thereof.

Typically, the printing ink, typically 3D printing ink, comprises 2-(2'-hydroxy-5-octylphenyl)benzotriazole, 2-(2'-hydroxy-5"-methylphenyl)benzotriazole, 2-(2'-hydroxy-5-octylphenyl)benzotriazole, 2-hydroxy-4-(2-hydroxy-3-methacryloyl oxy)propoxybenzo-phenone or mixtures thereof, more typically 2-(2'-hydroxy-5-octylphenyl)benzotriazole, 2-(2'-hydroxy-5-octylphenyl)benzotriazole or mixtures thereof as UV absorber.

The total proportion of at least one UV absorber in the printing ink, typically UV printing ink, is typically within a range from 0.01% by weight to 5.1% by weight, more typically within a range from 0.07% by weight to 3.9% by weight and more typically within a range from 0.09% by weight to 3.1% by weight, based in each case on the total weight of the printing ink, typically 3D printing ink. Aforementioned ranges relate both to the use of a UV absorber and to use of a mixture of UV absorbers.

The total proportion of at least one additive in the printing ink, typically 3D printing ink, is typically within a range from 0.0% by weight to 10.0% by weight, more typically within a range from 0.01% by weight to 5.0% by weight and most typically within a range from 0.02% by weight to 3.0% by weight, based in each case on the total weight of the printing ink, typically 3D printing ink. The ranges mentioned are applicable to the use of one kind of additive, of a mixture of different kinds of additive and of a mixture of different additives from one kind of additive.

It is self-evident that the individual components of the printing ink, typically 3D printing ink, should be chosen such that their proportions do not add up to more than 100% by weight.

The process for producing a spectacle lens on a precoated substrate comprises the following steps:
i. providing a coated substrate,
ii. providing a three-dimensional model of the spectacle lens,
iii. digitally cutting the three-dimensional model from step ii. into individual two-dimensional slices,
iv. providing at least one printing ink, typically 3D printing ink,
v. constructing the spectacle lens from the sum total of the individual two-dimensional slices from step iii. with a printing operation on the substrate,
vi. curing the spectacle lens, wherein the curing can be effected fully or partially after each application of individual volume elements or after application of a slice of volume elements, and the partial curing can be completed on completion of the printing process,
vii. optionally machining and/or grinding and/or turning and/or polishing the surface of the spectacle lens obtained in step vi. that does not adjoin the substrate,
viii. detaching the spectacle lens obtained in step vii. from the substrate,
ix. optionally coating the surface of the spectacle lens remote from the substrate,
x. optionally edging the spectacle lens obtained in step ix.

The detachment of the spectacle lens from the substrate may alternatively also precede the optional mechanical reprocessing in step vii.

The printing, typically 3D printing, of a spectacle lens commences with the provision of a three-dimensional model, typically CAD model. This three-dimensional model defines the three-dimensional geometry of the spectacle lens, i.e., the surface opposite the substrate and the cylinder edge face.

In an exemplary embodiment, the desired coloring of the spectacle lens with various colorants is calculated beforehand. The absorption of the spectacle lens is the result of the number of colored volume elements printed one on top of another. The color of the spectacle lens appears to the user as the sum total of all absorptions in the spectacle lens. Correspondingly, in the three-dimensional model, multiple slices each having at least one coloring component can be stacked one on top of another. The additive effect of at least two dye-containing slices can be calculated.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A process for producing a spectacle lens comprising:
providing a coated substrate having at least one coating, wherein the at least one coating of the coated substrate is selected from the group consisting of a hard lacquer layer, an antireflection layer, an electrically conductive layer, a semiconductive layer, an antifog coating, or a clean-coat layer;
providing a three-dimensional model of the spectacle lens;
digitally cutting the three-dimensional model into individual two-dimensional slices;
providing at least one printing ink;
printing the individual two-dimensional slices onto the coated substrate to construct the spectacle lens as a sum total of the individual two-dimensional slices;
fully or partially curing the spectacle lens; and
detaching the spectacle lens together with the coating from the coated substrate.

2. The process as claimed in claim 1, further comprising at least one of:
coating a surface of the spectacle lens remote from the substrate after the detaching;
edging the spectacle lens;
fully or partially curing an individual volume element or a slice of volume elements during the printing;
completing a cure of a partially cured spectacle lens upon completion of the printing; or
performing at least one of machining, grinding, turning, or polishing a surface of the spectacle lens that does not adjoin the coated substrate.

3. The process as claimed in claim 1, wherein at least one of:
the substrate has been covered with a detachable bonding layer, or
the printing ink is 3D printing ink.

4. The process as claimed in claim 1, wherein the coated substrate, proceeding from the coated substrate, has been covered with the following layers:
a) optionally, a detachable bonding layer,
b) the clean-coat layer, the antifog layer, or the clean-coat layer and the antifog layer;
c) the antireflection layer;

d) optionally, the electrically conductive or the semiconductive layer; and
e) the hard lacquer layer,
wherein the electrically conductive or the semiconductive layer is optionally part of the at least one antireflection layer.

5. The process as claimed in claim 4, wherein the detachable bonding layer is a clean-coat layer which, after the detaching of the printed spectacle lens, forms the outer layer of one of the surfaces of the spectacle lens.

6. The process as claimed in claim 1, wherein the detachable bonding layer comprises alkyltrihalosilanes or is applied by plasma-induced gas phase deposition of a siloxane layer on the substrate.

7. The process as claimed in claim 1, wherein the precoated substrate is in a convex or a concave form and a surface topography of the precoated substrate is selected from the group consisting of spherical, aspherical, toric, atoric, progressive, or planar.

8. The process as claimed in claim 1, wherein the spectacle lens has been coated on an opposite side of the substrate with the at least one layer selected from the group consisting of the hard lacquer layer, the antireflection layer, the electrically conductive layer, the semiconductive layer, the antifog layer, or the clean-coat layer.

9. The process as claimed in claim 1, wherein the surface of the spectacle lens remote from the substrate, proceeding from the surface, comprises the following layer sequence:
a) the hard lacquer layer;
b) optionally, the electrically conductive or the semiconductive layer;
c) the antireflection layer; and
d) optionally, the clean-coat layer, the antifog layer, or the clean-coat layer and the antifog layer.

10. The process as claimed in claim 1, wherein the printing ink comprises:
a radiation-curable component; and
optionally, at least one colorant,
wherein the radiation-curable component includes at least one monomer selected from the group consisting of (meth)acrylate monomers, epoxy monomers, vinyl monomers, and allyl monomers, and
wherein:
a) i) a total proportion of at least one kind of monofunctional (meth)acrylate monomer is within a range from 0.0% by weight to 35.0% by weight, based on a total weight of the printing ink, or the total proportion of at least one kind of monofunctional epoxy monomer, vinyl monomer, or allyl monomer or of a mixture of different monofunctional (meth)acrylate monomers, epoxy monomers, vinyl monomers or allyl monomers is in each case within a range from 0.0% by weight to 60% by weight, based in each case on the total weight of the printing ink, and/or ii) the total proportion of at least one kind of difunctional (meth)acrylate monomer, epoxy monomer, vinyl monomer or allyl monomer or of a mixture of different difunctional (meth)acrylate monomers, epoxy monomers, vinyl monomers or allyl monomers is in each case within a range from 32.0% by weight to 99% by weight, based in each case on the total weight of the printing ink, and/or iii) the total proportion of at least one kind of trifunctional (meth)acrylate monomer, epoxy monomer, vinyl monomer or allyl monomer or of a mixture of different trifunctional (meth)acrylate monomers, epoxy monomers, vinyl monomers or allyl monomers is in each case within a range from 1.0% by weight to 51.0% by weight, based in each case on the total weight of the printing ink, and/or iv) the total proportion of at least one kind of tetrafunctional (meth)acrylate monomer, epoxy monomer, vinyl monomer or allyl monomer or of a mixture of different tetrafunctional (meth)acrylate monomers, epoxy monomers, vinyl monomers or allyl monomers is in each case within a range from 0% by weight to 16% by weight, based in each case on the total weight of the printing ink, or
b) the printing ink includes at least one monofunctional radiation-curable component and at least one difunctional radiation-curable component in a weight ratio of 1:1, or at least one monofunctional radiation-curable component and at least one trifunctional radiation-curable component in a weight ratio of 1:5 or at least one difunctional radiation-curable component and at least one trifunctional radiation-curable component in a weight ratio of 1:1, or at least one difunctional radiation-curable component and at least one tetrafunctional radiation-curable component in a weight ratio of 5:1, or at least one monofunctional radiation-curable component and at least one difunctional radiation-curable component and at least one trifunctional radiation-curable component in a weight ratio of 1:5:1.

11. A spectacle lens produced with a printing method, wherein the printing method comprises:
providing a printable coated substrate;
providing a three-dimensional model of the spectacle lens;
digitally cutting the three-dimensional model into individual two-dimensional slices;
providing at least one printing ink containing at least one radiation-curable component in an amount from 31% by weight to 98.5% by weight, based on a total weight of the printing ink;
constructing the spectacle lens from a sum total of the individual two-dimensional slices with a printing operation on the substrate;
curing the spectacle lens, wherein the curing is effected fully or partially after each application of individual volume elements or after application of a slice of volume elements, and the partial curing is completed on completion of the printing process;
optionally, performing at least one of machining, grinding, turning, or polishing a surface of the spectacle lens that does not adjoin the substrate;
detaching the spectacle lens together with the coating from the substrate;
optionally, coating the surface of the spectacle lens remote from the substrate; and
optionally, edging the spectacle lens,
wherein at least one individual two-dimensional slice is printed with a volume element containing a colorant and a neighboring volume element containing a radiation curable component other than the at least one radiation-curable component of the at least one printing ink, without the colorant.

12. The spectacle lens as claimed in claim 11, wherein the printing ink comprises:
at least one monofunctional radiation-curable component and at least one difunctional radiation-curable component in a weight ratio of 1:5, or at least one monofunctional radiation-curable component and at least one trifunctional radiation-curable component in a weight ratio of 1:3, or at least one difunctional radiation-curable component and at least one trifunctional radiation-curable component in a weight ratio of 5:1, or at least one difunctional radiation-curable component and at least one tetrafunctional radiation-curable component in a weight ratio of 10:1, or at least one monofunctional radiation-curable component and at least one difunctional radiation-curable component and at least one trifunctional radiation-curable component in a weight ratio of 2:13:0.5.

13. A method of providing a precoated substrate as a mold shell for printing of a spectacle lens, the method comprising:
arranging a detachable bonding layer on a substrate to form the precoated substrate;
coating the precoated substrate with at least one layer selected from the group consisting of a hard lacquer layer, an antireflection layer, an electrically conductive layer, a semiconductive layer, an antifog layer, and a clean-coat layer; and
forming the detachable bonding layer on the substrate with a plasma-induced gas phase deposition of a siloxane layer on the substrate.

14. A process for producing a spectacle lens comprising:
providing a coated substrate having at least one coating, wherein the at least one coating of the coated substrate is selected from the group consisting of a hard lacquer layer, an antireflection layer, an electrically conductive layer, a semiconductive layer, an antifog coating, or a clean-coat layer;
providing a three-dimensional model of the spectacle lens;
digitally cutting the three-dimensional model into individual two-dimensional slices;
providing at least one printing ink;
printing the individual two-dimensional slices onto the coated substrate to construct the spectacle lens as a sum total of the individual two-dimensional slices;
partially curing the individual two-dimensional slices during the printing;
completing a cure of the partially cured spectacle lens upon completion of the printing; and
detaching the spectacle lens together with the coating from the coated substrate.

* * * * *

UNITED STATES PATENT AND TRADEMARK OFFICE
CERTIFICATE OF CORRECTION

PATENT NO. : 11,400,668 B2
APPLICATION NO. : 16/384185
DATED : August 2, 2022
INVENTOR(S) : von Blanckenhagen et al.

It is certified that error appears in the above-identified patent and that said Letters Patent is hereby corrected as shown below:

In the Specification

In Column 10, Line 10: change "tri s(2,3-epoxypropyl)" to -- tris(2,3-epoxypropyl) --

In Column 11, Line 51: change "1,3,5-tri allyl" to -- 1,3,5-triallyl --

In Column 14, Line 37: change "2-(dim ethyl amino)" to -- 2-(dimethyl amino) --

In Column 15, Line 66: change "Kruss DSA 100" to -- Krüss DSA 100 --

In Column 18, Line 67: change "methacryloyl oxy" to -- methacryloyloxy --

Signed and Sealed this
Eighth Day of November, 2022

Katherine Kelly Vidal
*Director of the United States Patent and Trademark Office*